United States Patent [19]
McFarland

[11] Patent Number: 5,805,366
[45] Date of Patent: Sep. 8, 1998

[54] REAR VISION MIRROR APPARATUS WITH SIGNALS

[76] Inventor: Larry McFarland, 976 Downing Dr., Eagle, Id. 83616

[21] Appl. No.: 740,921

[22] Filed: Nov. 5, 1996

[51] Int. Cl.⁶ .............. G02B 5/08; G02B 7/182; B60Q 1/26; B60R 1/12
[52] U.S. Cl. .......... 359/864; 359/872; 359/838; 362/83.1; 340/475; 340/479
[58] Field of Search .................. 359/838, 864, 359/865, 871, 872; 362/83.1; 340/475, 479

[56] References Cited

U.S. PATENT DOCUMENTS

| | | | |
|---|---|---|---|
| 1,563,258 | 11/1925 | Cunningham | 362/83.1 |
| 1,602,094 | 10/1926 | Badding | 362/83.1 |
| 2,561,582 | 7/1951 | Marbel | 362/83.1 |
| 2,600,751 | 6/1952 | Gazda | 362/83.1 |
| 3,146,296 | 8/1964 | Fischer | 359/864 |
| 3,170,985 | 2/1965 | Katulich | 359/864 |
| 3,375,053 | 3/1968 | Ward | 359/864 |
| 5,016,996 | 5/1991 | Ueno | 362/83.1 |
| 5,059,015 | 10/1991 | Tran | 362/83.1 |
| 5,253,115 | 10/1993 | Ueno | 359/838 |

FOREIGN PATENT DOCUMENTS 1602384  11/1981  United Kingdom ........... 359/865

*Primary Examiner*—Ricky D. Shafer
*Attorney, Agent, or Firm*—Litman, McMahon & Brown, L.L.C.

[57] ABSTRACT

A rear view mirror apparatus has a housing which includes a faceplate. A first mirror is positioned within the faceplate. A second mirror, being convex, is positioned within the faceplate and is separated from the first mirror by a portion of the faceplate. A brake indicator light are also positioned within the faceplate.

1 Claim, 2 Drawing Sheets

REAR VISION MIRROR APPARATUS WITH SIGNALS

BACKGROUND

1. Field of Invention

This invention relates to rear view mirrors, specifically to a rear view mirror apparatus which includes multiple mirrors and signaling lights.

2. Description of Prior Art

Any driver on the road must contend with the "blind spot". This spot is located along the outside and to the rear of any vehicle. It is the area not shown by conventional rear view mirrors. Convex mirrors are sometimes used, particularly small round or rectangular mirrors that are attached inside the viewing area of a conventional mirror.

The blind spot is substantially larger for longer vehicles such as trucks, RVs, and any vehicle pulling a trailer. Small convex mirrors are limited in that a vehicle revealed in the convex mirror appears very small and may go unnoticed. Small convex mirrors are frequently attached to the surface of a conventional rear view mirror, thereby taking away from the viewing area of the conventional mirror. The close proximity of the two types of mirrors may also create a visual image that is not easily interpreted, requiring a driver to divert attention from the road immediately ahead. This may be a particularly dangerous situation because a hazard in the road immediately ahead may be the exact reason a driver must check the blind spot before turning or changing lanes.

Additionally, drivers cannot see the turn signals positioned at the back of a long vehicle while they are passing or being passed. Often, if the first vehicle is not seen by the driver of a long vehicle, the first notice that the long vehicle is changing lanes or turning is that the long vehicle begins moving towards the first vehicle. The driver of the first vehicle must swerve and attempt to blow the horn. The driver of the long vehicle must then swerve quickly back away from the first vehicle. This situation can create panic on the part of either driver, increasing the likelihood of an accident.

What is needed is a rear view mirror apparatus that has a conventional mirror, a separate convex mirror, and signals for braking and turning.

SUMMARY

The rear view mirror apparatus of the present invention includes a housing, a conventional mirror, a separate convex mirror, a brake light indicator and a turn signal light.

One feature of the Rear view mirror apparatus is that the conventional mirror and the convex mirror are separated. This reduces possible confusion because the convex mirror is not taking away from or altering the view from the conventional mirror. The driver can look distinctly into either mirror.

Another feature of the rear view mirror apparatus is that it includes a turn signal light. While looking at the mirror apparatus the driver can confirm that the turn signal is operating. Additionally, the turn signal is visible to other drivers who might not be able to see the turn signals located at the rear of a long vehicle. The location of a turn signal on the rear view mirror apparatus gives the driver of an unseen vehicle the opportunity to blow the horn prior to the longer vehicle moving towards the unseen vehicle. This notifies the driver of the long vehicle that there is another vehicle in the way and the potential accident is avoided prior to the vehicles ever moving towards each other. The location of brake lights on the apparatus similarly protects drivers by giving advance notice of slowing for an impending turn or lane change.

DETAILED DESCRIPTION

Figure 1:
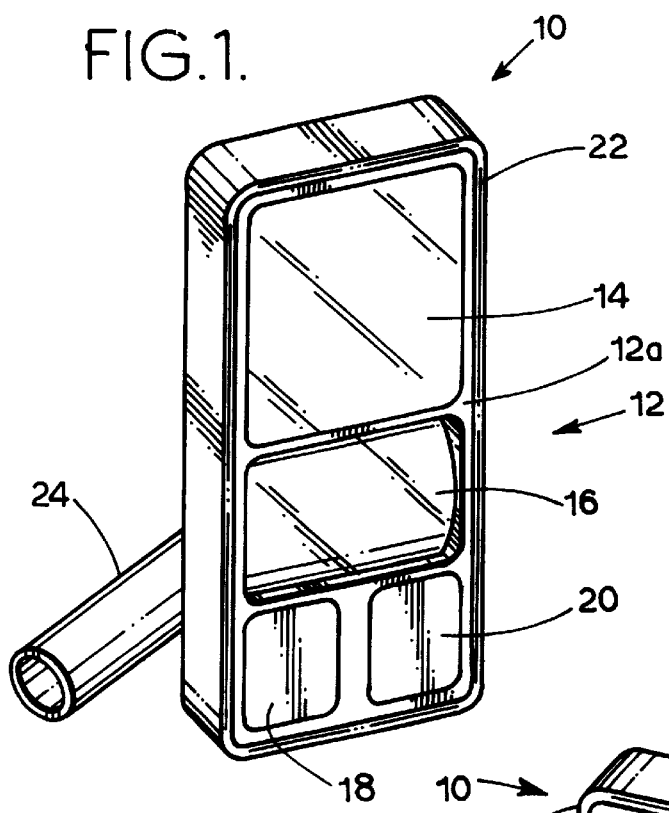
FIG. 1 is a perspective view of the right side rear view mirror apparatus.

FIG. 1 is a perspective view of a rear view mirror apparatus 10. The rear view mirror apparatus 10 is designed for placement on the right side of a vehicle and includes a housing assembly 12. The housing assembly 12 includes a housing faceplate 12A. The faceplate 12A is structured to have cutouts for the placement of a conventional mirror 14, a convex mirror 16, a brake light indicator 18, and a turn signal light indicator 20. The convectional mirror 14 is located at the top of the faceplate 12A. The convex mirror 16 is located just below the conventional mirror 14. The brake light indicator 18 is located below the convex mirror 16 and to the side of the faceplate 12A closest to the vehicle. The turn signal light indicator 20 is located below the convex mirror 16 and adjacent to the brake light indicator 18. The outer edges of the housing assembly 12 is surrounded by a protective rubber seal 22 which prevents water from entering the housing assembly 12. The rear view mirror apparatus 10 is attached to a vehicle by hollow support 24.

Figure 2:
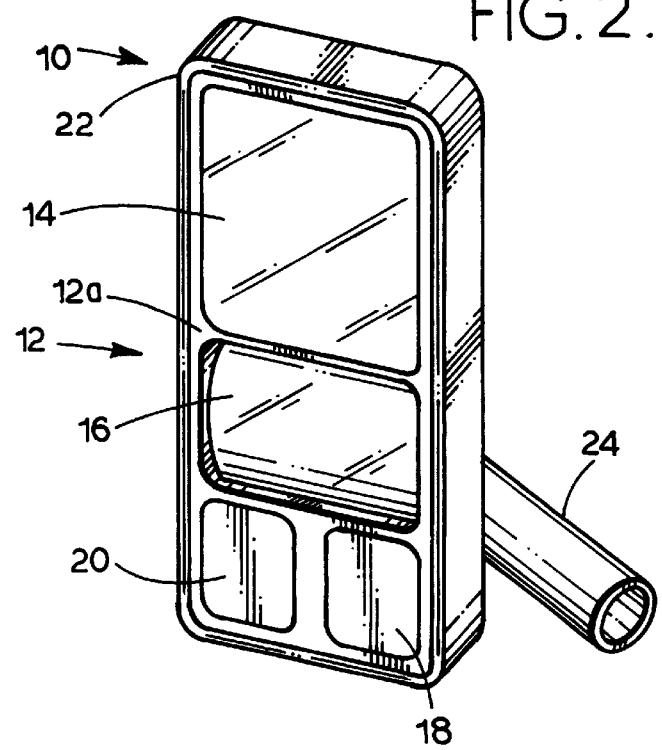
FIG. 2 is a perspective view of the left side rear view mirror apparatus.

FIG. 2 is a perspective view of a rearview mirror apparatus 10 designed for placement on the left side of a vehicle. FIG. 2 is similar to FIG. 1 except the positions of the brake light indicator 18 and the turn signal light indicator 20 have been reversed. This maintains consistency in that the brake light indicator 18 remains closest to the vehicle.

Figure 3:
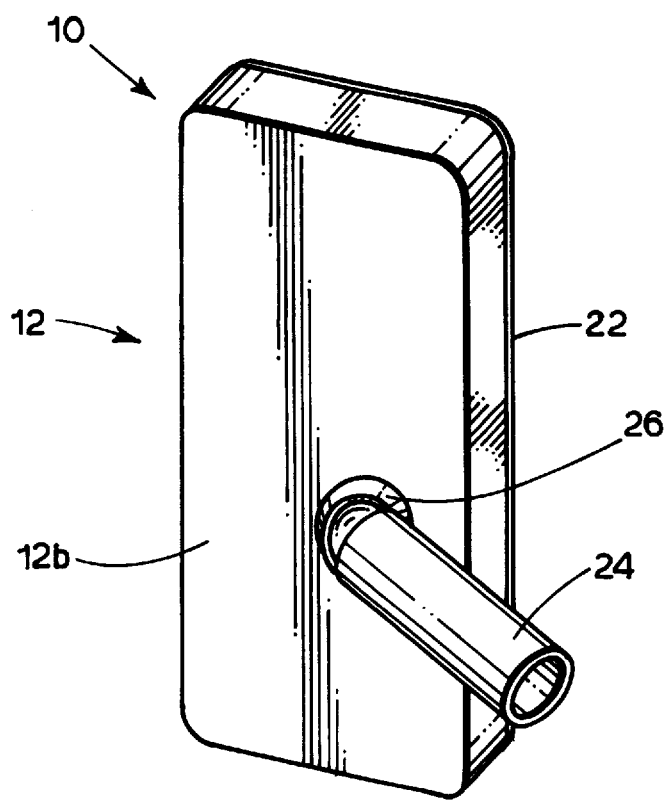
FIG. 3 is a rear view of the rear view mirror apparatus.

FIG. 3 is a perspective view of the rear side of the rear view mirror apparatus 10. FIG. 3 shows housing cover 12B surrounded by seal 22. Cover 12B is attached to support 24 using an adjustable ball and socket joint 26. The joint 26 is structured to have an aperture such that necessary wiring may pass through the joint 26 and into support 24.

Thus the rear view mirror apparatus of the present invention provides both a conventional mirror and a convex mirror increasing a driver's ability to locate other vehicles in close proximity.

Additionally, the rear view mirror apparatus of the present invention provides braking and turn signal indicators that can be seen by vehicles alongside long vehicles equipped with the rear view mirror apparatus.

While the above description contains many specificities, these should not be construed as limitations on the scope of the invention, but rather as an exemplification of one preferred embodiment thereof. Many variations are possible. For example:

a. the exact positions of the mirrors and light indicators may be altered; and b. the hollow support may be fixed with adjustment of the mirrors within the housing assembly controlled electronically.

Accordingly, the scope of the invention should be determined not by the embodiment illustrated, but by the appended claims and their legal equivalents.

The invention claimed is:

1. A rear view mirror apparatus, comprising:

a. a housing having a faceplate and an interior, the faceplate structured to have a plurality of apertures, including an upper aperture, first and second lower apertures and an intermediate aperture positioned between said upper aperture and said lower apertures;

b. a first mirror positioned to occupy said upper aperture in the faceplate;

c. a second mirror positioned to occupy the intermediate aperture in the faceplate, the second mirror being convex;

d. a brake light indicator light positioned to occupy one of the lower apertures in the faceplate;

e. a turn signal indicator light positioned to occupy the other of said lower apertures in the faceplate;

f. a rubber seal surrounding the housing;

g. a support disposed outwardly from the housing, said support being attached to the housing by an adjustable ball and socket joint; and h. said support being hollow and said adjustable ball and socket joint being structured to have a duct leading from the interior of the housing to the hollow support.

* * * * *